United States Patent

[11] 3,610,935

[72] Inventor Geza Von Voros
Glen Rock, N.J.
[21] Appl. No. 21,861
[22] Filed Mar. 23, 1970
[45] Patented Oct. 5, 1971
[73] Assignee Optograms, Inc.
Glen Rock, N.J.

[54] INCREMENTAL OPTICAL CURVE TRACER WITH SEQUENTIAL LOGIC COMPRISING PLURAL COMPARATORS AND MEANS FOR LIMITING LENGTH OF STEPWISE MOVEMENT
20 Claims, 21 Drawing Figs.

[52] U.S. Cl................................................... 250/202,
318/577
[51] Int. Cl..................................................... G06k 11/02
[50] Field of Search............................................ 250/202,
206; 318/577

[56] References Cited
UNITED STATES PATENTS
2,838,683  6/1958  Munro......................... 250/202 X
3,502,880  3/1970  Martinek et al. ............. 250/202

Primary Examiner—Archie R. Borchelt
Assistant Examiner—T. N. Grigsby
Attorney—Ralph R. Roberts ABSTRACT: An incremental optical curve tracer with sequential logic is disposed to guide a precision machining operation and/or produce a drawing in which any of one-, two- or three-dimensional curves, lines or combinations thereof are converted stepwise into a corresponding linear or rectilinear equivalent. The curve or line of a drawing or master print is illuminated to obtain a brightness difference between the edge of the curve being followed and the adjacent print area. An optical reading head having a single optical fiber has a miniature photosensor attached thereto and is adapted to receive a magnified image of a portion of the line being read upon an optical decoding matrix disposed in the focal plane of the magnified optical image. This head is driven by stepping motors or equivalent stepping actuators for each coordinate axis relative to the line being "read." The electrical signal or output from the photosensor is fed to a logic system which determines the subsequent commands to the actuators. As the optical head is moved so also is a secondary positioning means moved in a precise relationship to the head. The secondary positioning means may be either a writing mechanism or a machine tool. The geometry of the information being read or produced may be one-, Two- or three-dimensional, and the like movement of the secondary means which is usually a machine tool, when so moved produces a part in accordance to the information being "read." In one embodiment the single "reading" fiber optic is surrounded by four other fiber optics, each of which has a miniature photosensor attached thereto with the outer optics adapted to "read" a much larger portion of the line and to feed this reading to a logic system so that this logic system can prevent scratches or imperfections in the line to be followed by the single fiber optic. The stepwise movement of the reading head does not exceed two-fifths of the diameter of the reading optic.

INVENTOR.
GEZA VON VOROS
BY
Ralph R. Roberts
AGENT

INCREMENTAL OPTICAL CURVE TRACER WITH SEQUENTIAL LOGIC COMPRISING PLURAL COMPARATORS AND MEANS FOR LIMITING LENGTH OF STEPWISE MOVEMENT

CROSS-REFERENCE TO A RELATED APPLICATION

This invention relates to apparatus similar to, and in certain instances uses component arrangements identical to, the apparatus and method shown and described in U.S. Pat. application Ser. No. 698,648, filed Jan. 17, 1968 and entitled, "Optographical Memory and Digitalized Control System for Precision Machining." This application is now U.S. Pat. No. 3,502,882, and issued on Mar. 24, 1970 in the name of Geza von Voros. This patent is incorporated by reference into the present application particularly as to the matter describing the use of the graphical function generator, the truth table and the simplest optical decoding matrix using four optic fibers and four photosensors. This incorporation by reference is made according to the notice in 34 Fed. Reg. 883 of Jan. 15, 1969.

BACKGROUND OF THE INVENTION

1. Field of the Invention

In reference to the classification of art as established in the United States Patent Office, the art to which the present invention pertains is found generally in the class of "*Radiant Energy*" and the subclass of "photocells; circuits and apparatus"; the further sub-subclass of "photocell controls its optical system" and the subclass thereunder of "following a pattern (line or edge)." Relevant art may also be found in the class of "*Registers*" and the subclass of "with manufacturing process control"; and "machine tool." The field of relevant art may also include the class of "Communication, Electrical" and the subclass of "error-checking systems."

2. Description of the Prior Art

In the field of automatic machine tool control, several guiding devices have been invented in the past. These devices may be divided into the following categories.

a. Mechanical tracking devices wherein templates and apparatus employing a simple cam follower principle are used to guide the machine tool either directly or through electromechanical or electrohydraulic actuators.

b. Electro-optical line tracers whereby the curve or line to be traced is optically detected and the output of photosensitors is used with a closed-loop servosystem to position the machine tool. Patents representative of such line-tracing devices are shown in U.S. Pat. No. 3,214,661, to DUFF of Oct. 26, 1965; No. 3,015,730 to Johnson of Jan. 2, 1962; No. 3,286,142 to REDMAN of Nov. 15, 1966; No. 2,988,643 to INABA of June 13, 1961; and No. 2,989,639 to DULEBOHN of June 20, 1961.

The few representative devices mentioned above, as well as others, are inherently sensitive to instabilities due to the closed-loop servocontrol whereby mechanical vibration of the controlled machine or sensing means will feed back its oscillatory motion to the error-sensing means. In order to avoid the undesired self-excitation of this system, the sensitivity in the system must be decreased which will correspondingly increase the tracing error.

In order to ensure a constant net speed of the guided cutting tool when tracing a plane curve, a sine-cosine drive or integrator must be used with the forementioned tracers which require the rotation of the optical sensor, thus introducing additional sources of error. Furthermore, the above-mentioned devices are not capable of satisfactorily following sudden turns in the curve to be traced without overshoot or overtravel whose amplitude will increase with the tool speed and may result in instabilities and oscillation of the system. Some of the optical sensors described in the forementioned patents utilize light choppers or oscillating photocells or vibrating mirrors. These impose limitations on the speed of the system as well as, in many cases, requiring the line thickness of the curve to be followed to be within close tolerances, thereby introducing additional sources of possible error.

c. Tape, magnetic-drum- or punch-card-controlled machines are other known curve following or generating system. These devices or systems provide accurate positioning with or without feedback. The disadvantage of these machines is the relatively high price; the frightening complexity of the system for the layman; the time-consuming and expensive programming procedure required; the necessarily large storage volume, and the difficulty of identification of the relations between the stored data of a point in the coordinate system and the location of that point on the workpiece. Furthermore, for multipass operations the machining operation must be stopped and the tape or punch card must be rewound or repositioned.

d. High-speed digital electronic control systems using intermittent step motions to provide coordinate movement; such systems are shown in U.S. Pat. Nos. 3,385,244 and 3,385,245 both issuing on May 28, 1968 to W. A. RAMSEY et al. and my U.S Pat. No. 3,502,882, issuing Mar. 24, 1970. The high-speed digital electronic control system as shown in the above patents and in the present invention eliminates most of the fo rementioned shortcomings of other devices and provides an inexpensive system capable of transforming an inaccurate engineering drawing or sketch or a cutout piece of cloth into a stepwise linear or stepwise rectilinear movement.

In the above-referenced patents to Ramsey and in my U.S. Pat. No. 3,135,857 which issued on June 2, 1964, the reading of the line or edge is by photosensors predeterminately spaced from each other so that operations such as sewing or welding can be performed. The systems of these patents prevent accurate line tracing to modern machining tolerances of a precision of one-thousandth of an inch or better. By utilizing the digital control of my U.S. Pat. No. 3,502,882 and this invention, the open-loop servo is insensitive to mechanical vibration of the controlled machine tool, thereby eliminating instabilities. The stored data being "read" is in the form of a drawing which enables a ready identification of the workpiece to be made as well as the locating of the corresponding coordinates between the stored data and the workpiece by a simple visual inspection. A correction of the master print for any tool diameter is readily provided. The sensing system does not contain any internal moving parts so that the speed of operation is not limited by the construction or movement of the sensing means.

SUMMARY OF THE INVENTION

The present invention may be summarized at least in part with reference to its objects.

It is an object of this invention to provide an incremental optical curve tracer with sequential logic adapted for the precision machining of a workpiece or for producing a master print and the like. This tracer is adapted to "read" a curve of one, two or three dimensions and to convert these curves into linear and rectilinear equivalents of the curve. This tracer includes an optical head for "reading" a source of data, said head including a fiber optic of determined small diameter with a photosensitor attached to one end of the fiber optic, said photosensitor being responsive to the "reading" of the data so as to send a signal to a logic system in response to said reading. The optical head is displaced in a stepwise manner relative to the source being "read" with the stepwise displacement corresponding in its movements to at least one of the one, two or three coordinate directions of the data or information being "read." The stepwise incremental movement of the optical head is not greater than two-fifths the effective radius of the fiber optic divided by the magnification of the optic. A logic system is adapted to receive the signals from the optical head and to transform these signals into stepping commands to displace the optical head ad to provide like stepping commands to a secondary positioning means.

It is further object of the invention to provide an optical curve tracer with sequential logic in which the optical head includes a small fiber optic having a small end portion of determined diameter. This fiber optic, tapered or cylindrical, is surrounded by four fiber optics, each having a small end portion extending from a main body to an image-receiving end of greatly reduced diameter. The body ends of these fiber optics are each also optically connected to a photosensor. An additional photosensor, not a part of the reading matrix, is carried by the head so as to "read" the general light level of the source of data being "read." The localized data being "read" by the central fiber optic and the four surrounding fiber optics of the head are fed through a lens system so as to magnify the viewed localized data, such as a line of a drawing.

It is a still further object of this invention to provide an optical curve tracer with sequential logic in which the secondary positioning means includes a writing system adapted to produce a line on a data-storing medium such as Mylar film.

It is a still further object of this invention to provide an optical curve tracer with sequential logic in which the optical head is fixedly mounted in a housing which is moved in determined incremental steps, with the housing and those optical fibers that are carried therein being brought to a stationary condition during the reading of the data. The "reading" optical head produces signals which may be fed to a writing mechanism adapted to draw a master print on Mylar and the like. The drawing or master print so produced is of a determined precision such as one-thousandth of an inch or better. The width of the line is merely a matter of selection and is not critical, as only the inner or outer edge of the line is "read" by the optical head. The width of the line is at least twice the radius of the effective circular sensing surface of the fiber optic.

Where desired, the apparatus may be programmed to read a third dimension in synchronism with the "reading" of the x–y coordinates of a drawing. The resulting movement of the machine tool operation is not only a precise x–y control but also provides a responsive z movement representative of the height or thickness contour.

It is a further object of this invention to provide a circuit in which four comparators are adjustably set to selected threshold levels and in particular to a circuit where the extreme high and low light-reading levels may be adjustably set to be "read" by two comparators.

It is a further object of this invention to provide a circuit in which a logic or logics is arranged to receive signals from a "reading" head and to program the stepwise reading head actuation to follow an acutely angled broken line.

It is a further object of this invention to provide a circuit in which logics are provided which analyze a change in direction of the reading head and provide a selected number of extra pulses of the actuators to accommodate the "backlash" error in the motion-producing mechanism.

This invention contemplates the use of an optical head in which a single fiber optic is connected to a photosensitor. The output of this photosensitor is fed to a digital logic in which the signals of the photosensitor is compared in relation to determined rules. In response to step-commands from the digital transistor logic the optical head is moved along x–y coordinates in steps with simultaneous step-commands being fed to a tool positioner. Only one step is made at a time in either the x or y direction in accordance with signals derived from the optical head "reading" of the master print. The speed of tracing is a selected constant and is contemplated as being at a "dialed-in" clock rate.

In an alternative embodiment the single "master" fiber optic having an effective reading diameter of determined small size such as a half-thousandth of an inch in diameter is surrounded by four larger diameter fiber optics arranged in a contiguous precision square. The outer grouped fiber optics are each connected to a photosensor whose electrical signal is fed to a logic system which observes or "reads" the signal and determines that the optical head is properly following the edge of the line being "read."

The apparatus of this invention also provides a "reading" station whereat the machine operator may visually inspect the master print or drawing as the machine tool is making its cut. With the drawing or master print made to a high standard of accuracy the optical head reading thereof provides no accumulation of error. The drawing or program for the optical memory is in the form of a master print generally on a thin Mylar sheet or glass plate which minimizes storage space as well as time necessary for identification and orientation. To use this system requires no special training or skill of the machine operator other than the skill normally expected to operate a conventional machine tool.

In the present invention there is provided in one embodiment an optical head movable in an x and y direction. This head is adapted to "read" either the inside or outside of a line and to follow this line with a noncumulative error which is of a determined maximum such as one ten-thousandth of an inch. As this line is followed, signals from the optical head are simultaneously fed to a slave positioner at a machine tool or the like so that the positioner moves in synchronism with the "reading" optical head.

As disclosed in my above-referenced U.S. Pat. No. 3,502,882, an optical head may be disposed above a programmer having an illuminated table and a precision straight edge movable thereover. Precision circle-segments with varying radii are also contemplated as being provided on the table as well as a place for other selected shapes. By manipulation of this programmer, sections of an engineering drawing or sketch may be reproduced with high accuracy through the stepwise operation of the optical head which is caused to trace the edges of the displayed geometry.

INTENT OF THE DISCLOSURE

Although the following disclosure offered for public dissemination is detailed to ensure adequacy and aid in understanding of the invention, this is not intended to prejudice that purpose of a patent which is to cover new inventive concept therein no matter how it may later be disguised by variations in form or additions of further improvements. The claims at the end hereof are intended as the chief aid toward this purpose, as it is these that meet the requirement of pointing out the parts, improvements and combinations in which the inventive concepts are found.

There has been chosen a specific embodiment and an alternate embodiment thereof of an incremental curve tracer having a sequential logic adapted for "reading" and producing lines of extreme accuracy. This "reading" head may have one fiber optic or a matrix of five fiber optics with additional light-level-compensating means.

This specific embodiment and the alternate embodiment have been chosen for the purpose of illustration and description as shown in the accompanying drawings wherein:

BRIEF DESCRIPTION OF THE DRAWINGS

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that details may be modified in various respects without departure from the concept and principles of the invention and that the invention may be incorporated in other forms than shown.

DESCRIPTION OF THE PREFERRED EMBODIMENTS

Figure 1:
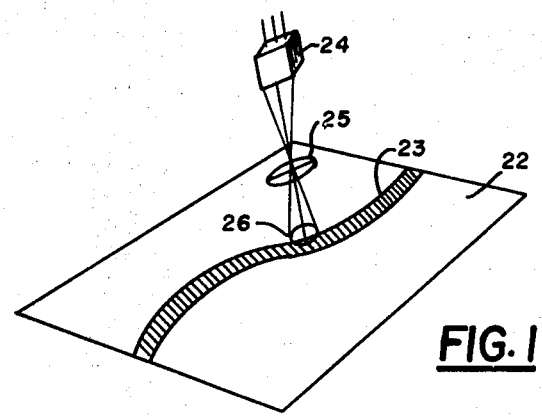
FIG. 1 represents a simplified isometric and diagrammatic view showing "reading" head of the optical curve tracer "-tracking" or "reading" the edge of a line of a master print.
Figure 3:
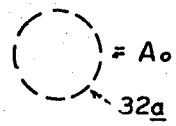
FIG. 3 represents a plan view diagram of the full diameter of the photosensitive surface and identified in the following equations as $A_o$.

Referring now particularly to FIG. 1, there is shown an illuminated master print 22 with a curved line 23 drawn thereon. The pring 22 is preferably of Mylar film, photographic glass plate or the like. The line 23 is "read" by an optical head 24 wherein a lens system 25 projects the image of a small portion 26 of line 23 onto a fiber optic or a specially arranged group of fiber optics in head 24. The lens system is contemplated as being a constant object-to-image distance type generally identified as a "zoom" lens system. In the contemplated matrix there may be a single optical fiber having a miniature photocell or photosensor attached to the optical fiber as shown in FIG. 3A of U.S. Pat. No. 3,502,882. This optical fiber receives the light from the illuminated master print and transmits the light to the photosensor. As shown in FIG. 3 of my U.S. Pat. No. 3,502,882 an aperture plate may be used to preselect or automatically adjust a light level for the decoding matrix. As also seen in this referenced FIG. 3 a photocell or photosensor, not a part of the "reading" matrix, is adapted "to read" the general light level of the drawing or master print. In another arrangement to be more fully described hereinafter in conjunction with FIG. 17 the optical decoding matrix has a central optical fiber whose small end may be five-thousandths of an inch in diameter. Contiguous to this central optical fiber and arranged in a precise square are the ends of four other fibers optics. These ends of these fiber optics are contemplated as being larger than the central optical fiber.

Figure 2:
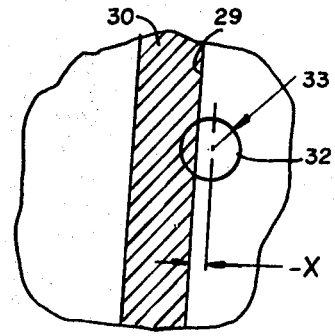
FIG. 2 represents a plan view of a sample positioning of the photosensitive surface as projected onto the line to be tracked.

Referring next to FIG. 2 there is shown the reading of the edge 29 of a line 30 by the scanning circle of a photosensor 32 having a radius 33. Since the output of a photosensor is a function of its illuminations, the relative position of the photosensor or light spot focused upon the line 30, with respect to the line being or to be "tracked," can be readily measured. When the photocell or sensor is completely within the dark area of the line a low output signal is sent from the photosensor. A fully illuminated photocell or sensor corresponding to a position "out-of-line," will give a high output signal. In FIG. 2 the position of the photosensor projected onto the line being tracked is to the right of the edge 29 of the line 30, and the photosensor is more than 50 percent illuminated. As shown in FIG. 2, part of the circularly shaped photosensitive area $A_o$ is in the dark area and the rest is illuminated. The normalized error in using a circular photosensitive circular area having a given radius R may be determined as follows:

Normalized area $= A/A_o$

Normalized error $= \lambda = x/R$ when:

$A_o = R^2\pi =$ area of photosensor $A =$ the fraction or portion of $A_o$ which is illuminated;

$x =$ error;

$R =$ radius of the circular photosensor or light spot;

The relationship between $A/A_o$ and the normalized error is shown in the following equation in which;

$$A/A_o = 1/\pi \cos^{11}\lambda - [\lambda(1-\lambda^2)^{1/2}]$$

Using this equation when:

$x = -R$ then $A/A_o = 1$ and when $x = R$ then $A/A_o = 0$

In FIG. 3 is shown the full-diameter photosensor or illuminated spot which in the above equation corresponds to $A_o$.

Figure 4:
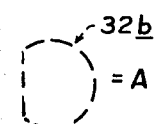
FIG. 4 represents a plan view diagram of the photosensitive surface with the fraction portion which is illuminated and in the following equations as A.

In FIG. 4 is shown a circular photosensor where that portion in the dark in FIG. 2 is absent from the full-diameter spot. The illuminated portion shown in this FIG. 4 corresponds to "A" in in the above equation.

Figure 5:
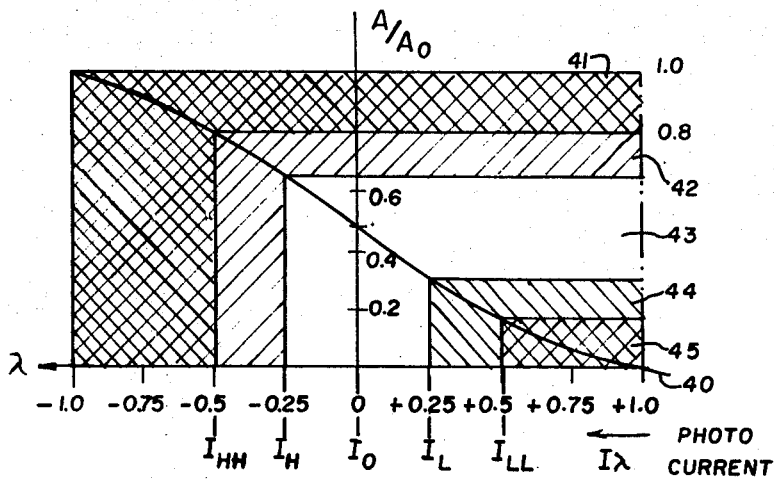
FIG. 5 represents a graphic plan view illustration of the characteristics curve of the equation relating the degree of error to the illuminated area ratio based on zero error when the photosensor is one-half illuminated.

In FIG. 5 is shown a graph of the characteristic curve of the above error equation when the single fiber optics is reading the precise edge with one-half in light and one-half in darkness and is at zero error. On this graph there is shown $I_{HH}$, $I_H$; $I_o$; $I_L$ and $I_{LL}$ wherein:

$I_{LL} =$ lowest current threshold level;

$I_L =$ lower current threshold level;

$I_o = A/A_o = ½$ center or zero error position;

$I_H =$ high threshold level; and $I_{HH} =$ highest current threshold level.

In the chart of FIG. 5 the line 40 depicts the above representation of the output current of the photosensor as it moves from the lowest output level $I_{LL}$ to the highest output level $I_{HH}$. When the sensitive area of the photocell is centered on the edge of the line defining the light-dark boundary the output current is $I_o$. Correspondingly a lower photocurrent $I_L$ is obtained when the fiber optic is positioned more into the dark portion of the scanned line. A higher photocurrent $I_H$ is obtained when the fiber optic is positioned more into the bright portion of the scanned line. The amplified output of the photocell or photosensor is connected to a comparator which is set to a selected threshold level to initiate a signal when the threshold is crossed. The comparator has as may output leads as there are selected threshold levels. The comparator is adapted to sample the output current of the photosensor so that with a particular threshold setting when the current output of the photosensor falls below the threshold the logic "reads" "0." When the current output exceeds the threshold level the logic "reads" "1."

In this chart the upper left double cross-hatched area identified as 41 is the area of "*exclusive* count down." The upper left single cross-hatched area identified as 42 is the area of "count down." The central unhatched area identified as 43 is the area of "no count." The lower right single hatched area identified as 44 is the area of "count up." The double cross-hatched area at lower right and identified as 45 is the "*exclusive* count up" portion. The error indication in this example is selected to provide λ=0 (corresponding to $I_o$ photocurrent) when the *circular* area of the photosensor is half in the dark and half in the bright along the lie to be tracked.

Figure 6:
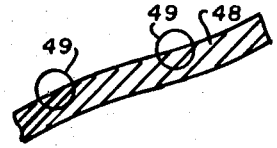
FIG. 6 represents a fragmentary line or curve with the center of the photosensor "reading" path being the precise edge of the line as in the graph of FIG. 5.

Such a line "reading" is shown in FIG. 6 wherein a curve line 48 is "tracked" by photosensor 49 with the "no count" condition being provided or occurring when the photosensor is centered on the edge of the line 48.

Figure 7:
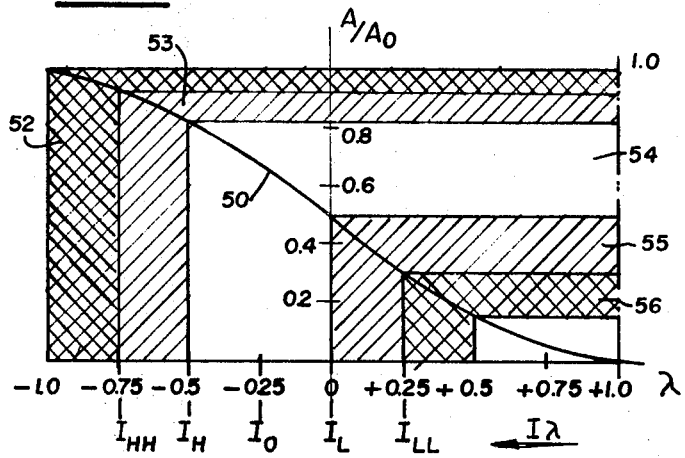
FIG. 7 represents a graphic plan view illustration of the characteristics curve relating the degree of error of the illuminated area ratio based on zero error when the photosensor is more than half illuminated.
Figure 8:
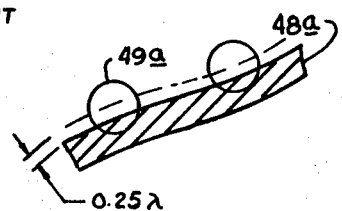
FIG. 8 represents a fragmentary line or curve with the photosensor "reading" path being offset a determined distance from the precise edge of the line as shown in the graph of FIG. 7.

In FIG. 7 there is shown the chart of the characteristic curve of the above equation when the threshold levels have been asymmetrically shifted so that the "no count" region corresponds to an offset illumination such as is shown in this chart and in the line "reading" of FIG. 8.

In the chart of FIG. 7 the line 50 begins at the upper left corner at λ=−1.0 and at λ=+1.0 the lower right exits from the chart or graph. The upper left double cross-hatched area identified as 52 is the area of "exclusive count down." The left upper single hatched area identified as 53 represents the area of "count down." The central unhatched area identified as 54 represents the area of "no count." The lower right single hatched area identified as 55 represents the area of "count up." The lower right double cross-hatched area identified as 56 represents the area of "exclusive count up."

The line "reading" of the chart of FIG. 7 is seen in FIG. 8 wherein a curve line 48a is "tracked" by a photosensor 49a with the center of the photosensor offset from the edge of the line by setting the threshold levels. Whereas the "tracking" of the line b FIG. 6 is with $I_o$ at λ=0, the "tracking" of this same line in FIG. 8 is with $I_o$ at λ=−0.25. Of course the offset can be adjusted by changing the threshold levels to provide other values of λ.

The positioning of the "reading" head and the fiber optic and photosensor of this optical curve tracer system is provided by stepping motors or other stepwise moving linear actuators. The step-width δ is shown in the equation in which $$\delta \leq \frac{2}{5}\frac{R}{M}$$

in which:
δ = step-width movement
M = the magnification of the optics, and
R = is radius of the photosensor or light spot.

The width of the line being "read" or tracked by this optical curve tracer is designated W and must be:
W≧2R These limitations must be maintained in order that the optical tracer will be accurate and fault-free.

BLOCK DIAGRAM OF FIG. 9

Figure 9:
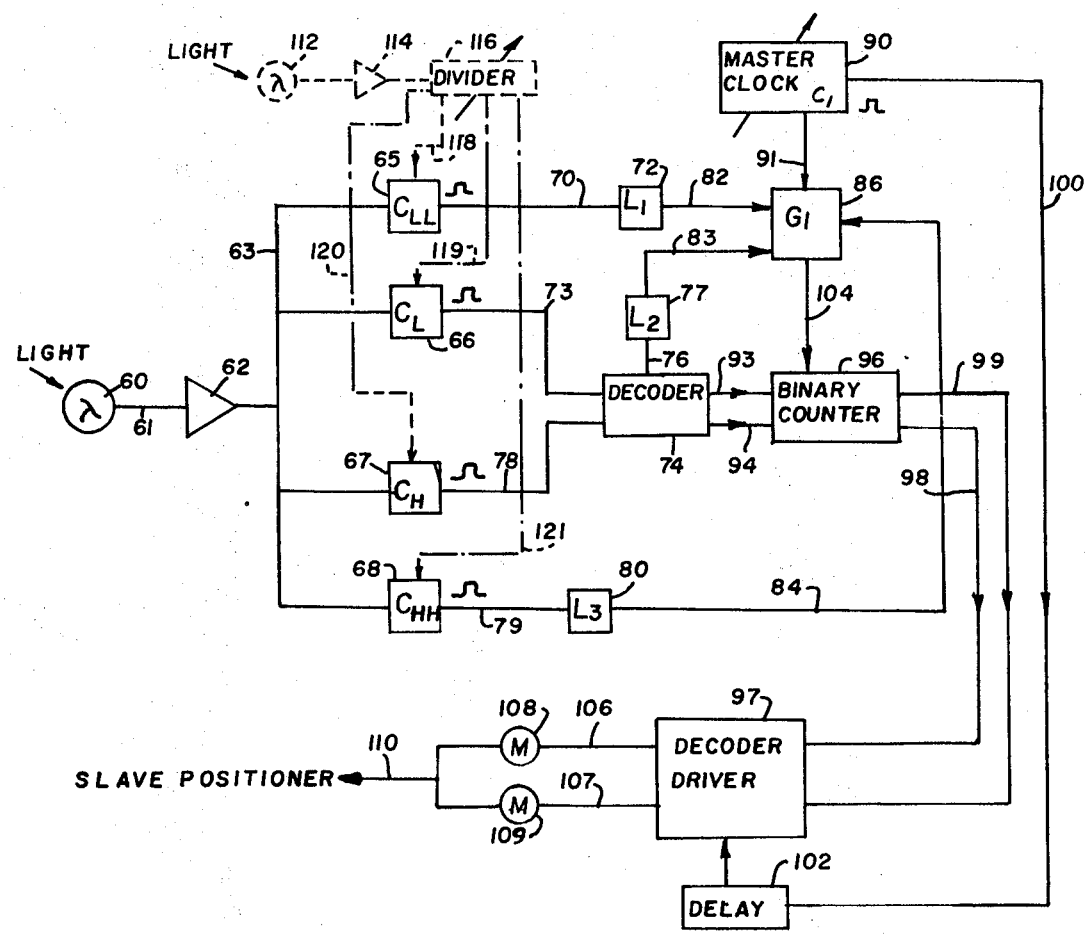
FIG. 9 represents the block circuit diagram of the optical line tracer system of this invention when the curve "reading" system employs a single photosensor and fiber optic.

Referring next to FIG. 9 there is shown a block diagram for an optical curve tracer with sequential logic in which light is received by photosensor 60 and the current therefrom is fed by conductor 61 to a preamplifier 62. From this preamplifier the output current ($I\lambda$) is fed through distribution conductor 63 to four comparators 65, 66, 67 and 68. Comparator 65 in this circuit is adapted to identify the current signal for the lowest current threshold level. Comparator 66 is adapted to analyze the current signal for the lower current level. Comparator 67 analyzes the current signal for the high current threshold level. Comparator 68 analyzes the current signal for the highest current threshold level. From comparator 65 ($C_{LL}$), the analyzed signal is fed through conductor 70 to a logic 72, which for the sake of identification is defined as Logic "1" ($L_1$). From comparator 66 ($C_L$), the analyzed signal is fed through conductor 73 to a decoder 74 and from this decoder a signal is fed through lead 76 to a logic 77, which for the sake of identification is defined as Logic "2" ($L_2$). From comparator 67 ($C_H$), the analyzed signal is fed through conductor 78 to the decoder 74. From comparator 68 ($C_{HH}$), the analyzed signal is fed through conductor 79 to a logic 80, which for the sake of identification is defined as Logic "3" ($L_3$).

Signals from logics "1," and "2" and "3" identified as 72, 77 and 80 are fed through conductors 82, 83 and 84 to a gate 86 ($G_1$), which is pulsed by a master clock 90 through conductor 91. Signal from the decoder 74 are fed through conductors 93 and 94 to a binary up-down counter 96 and from this counter the pulsed signals are sent to a decoder driver 97 through leads 98 and 99. From the variable master clock 90 a pulse signal is sent through conductor 100 to and through a delay 102 and to decoder driver 97. Also from the gate 86 a control signal is sent through conductor 104 to the binary counter 96. The pulsing signal to cause stepwise actuation of the reading head and of the slave positioner is fed from decoder driver 97 through conductors 106 and 107 to stepping actuators 108 and 109 and also to a slave positioner, not shown, through conductor 110.

In nearly all cases it is preferable that a light level compensator be provided to accommodate changes in the level of light fed to the photosensor 60. Accordingly an addition to the above-described circuit is shown in dashed outline wherein a photosensor 112 receives light from the source and through an amplifier 114 sends an output current to a variable divider 116. This divider compensates the preset threshold levels of comparators 65, 66, 67 and 68 through conductors 118, 119, 120 and 121.

OPERATION OF CIRCUIT DIAGRAM SHOWN IN FIG. 9

The output current of the single photocell 60 having a *circular* sensitive area is amplified by the preamplifier 62 and is connected to the comparators 65, ($C_{LL}$); 66, ($C_L$); 67 ($C_H$), and 68 ($C_{HH}$). The threshold level of these comparators is set by the adjustable divider 116. The several threshold levels may be set narrowly so as to track the exact center of a line or may be set less narrowly to accommodate offset illumination of the photosensor. The additional photocell 112 receives the average illumination from the scanned surface of the master print and is adapted to compensate the threshold levels against variations of light from the light source or changes in the optical conditions of the scanned surface. This function is described more fully in my U.S. Pat. No. 3,502,882. These comparators are of the "Schmitt" trigger type providing a step output whenever the set threshold level is crossed.

In this circuit of FIG. 9 the operation of the comparators $C_H$ and $C_L$ contemplates that the lower level of the comparator output is "0" and the higher output is "1," the corresponding photocurrent levels are as follows:

$$d = \frac{D}{\sqrt{2}-1} \approx 0.241D$$

| $C_H$ | $C_L$ | |
|---|---|---|
| 0 | 0 | $I_\lambda < I_L$ |
| 0 | 1 | $I_L < I_\lambda < I_H$ |
| 1 | 0 | cannot occur |
| 1 | 1 | $I_\lambda > I_H$ |

Figure 10:
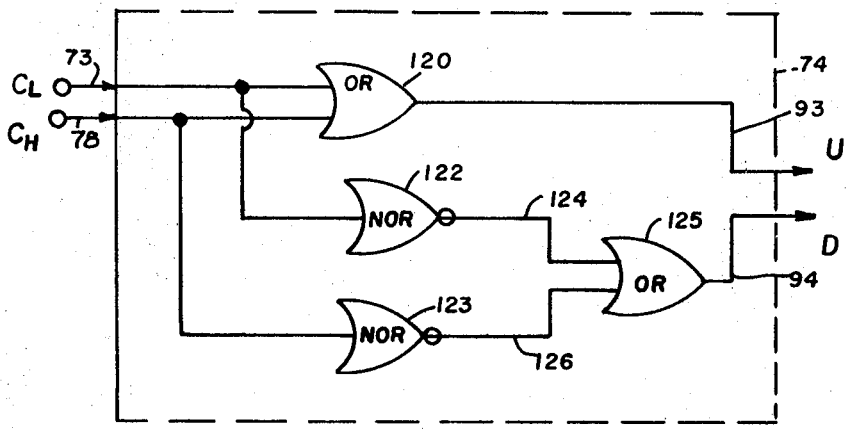
FIG. 10 represents a diagram of the circuit of a decoder such as is used in the circuit of FIG. 9.

The outputs of the comparators 66 and 67 are connected to the decoder 74 whose output through leads 93 and 94 may be designated "U" for "up count" and "D" for "down count." According to the following table this decoder 74 performs the functions shown in this truth table in which:

The implementation of this truth table may be accomplished by a simple OR, NOR gate combination as shown in FIG. 10.

DECODER OF FIG. 10

Referring now particularly to the circuit diagram of FIG. 10, the decoder 74 of FIG. 9 receives input signals from $C_L$ and $C_H$ through leads 73 and 78. Lead 73 ($C_L$) feeds its signal to OR 120 and to NOR 122. Lead 78 ($C_H$) feeds its signal to OR 120 and to NOR 123. From OR 120 the up "U" signal is sent to the binary up-down counter 96 through lead 93. From NOR 122 a signal through lead 124 is sent to OR 125 and from NOR 123 a signal is also sent through lead 126 to OR 125. From OR 125 the down "D" signal is sent through lead 94 to the binary counter 96 of FIG. 9.

The output lines "U" 93 and "D" 94 are connected to the binary ring-type up-down counter driven by the master clock 90 through gate 86. The function of gate ($G_1$) 86 will be described later in connection with a backlash error-correcting method. Every time the "U" line output is "0" the binary counter will count "up" one step for each clock pulse. In like manner when the "D" line output is "0" the binary counter will count "down" one step for each clock pulse. When both "U" and "D" are "reading" high or "1" the binary counter does not change state.

The binary counter of FIG. 9 is contemplated as having two flip-flops which, for identification in the following table are FF1 and FF2. This counter 96 has four stable positions each corresponding to an actuating step-signal in the $\pm x$ and $\pm y$ direction provided by the decoder-driver 97 actuating the $x$ and/or $y$ stepping actuators or motors 108 and 109. The truth table of the counter with respect to the direction of motion is given as follows:

It is to be noted that when the photocurrent increases from $I_o$ to $I_H$, a counterclockwise (CCW) turn is made. When $I_o$ changes to $I_L$ a clockwise (CW) turn will be made. Of course, by a simple switching technique the opposite rotational instruction from the binary counter may be given.

LINE OF FIG. 11

Figure 11:
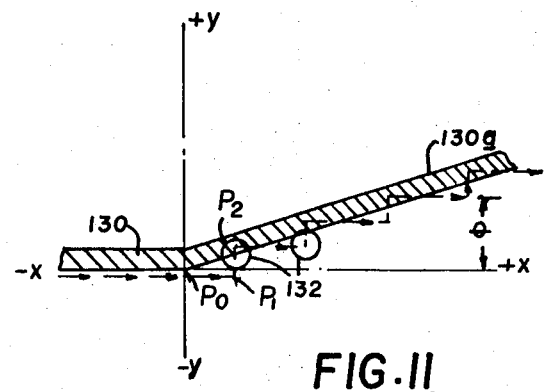
FIG. 11 represents a plan view of the "tracking" sequence of the edge of a straight line portion lying at a determined angle $\theta$ to the x-axis.

Referring now to the "tracking" sequence of a straight line having a portion at a slight angle $\theta$ to the x-axis there is seen in FIG. 11 a line 130 having a portion 130a disposed at a small angle to the x-axis. In following the line the traveling photosensor 132 travels in a $+x$ direction until it reaches $P_o$, after which the balanced light and dark condition begins to become unbalanced until it reaches point $P_1$ whereat a threshold $I_L$ is crossed and the up signal is given. The pulsed steps in this $+y$ direction continues until the balanced light condition is reached at $I_o$ and the up pulses continue until the $I_L$ threshold is reached at $P_2$, whereupon the "up" signal stops and the $+x$ direction of travel begins with the photosensor in the condition of $I_L$. This stepwise progression continues along the angled line until an end of the line is reached.

RECTANGULAR LINE OF FIG. 12

Figure 12:
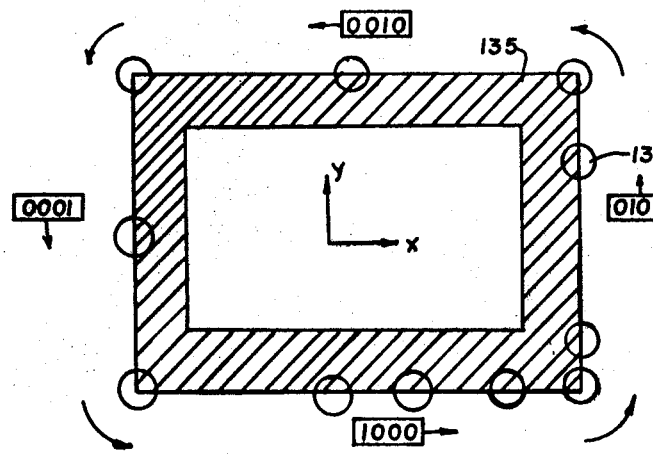
FIG. 12 represents a plan view of the "tracking" sequence of the outer edge of a rectangularly disposed line.

Referring next to the rectangular line pattern of FIG. 12, there is shown a line 135 which counterclockwise is "read" on its outside edge by a photosensor 136 traveling in a direction (CCW). The lengthwise travel along the lengths of the line 135, assuming that the end lines lie precisely parallel to the y-axis and the top and bottom lines are precisely parallel to the x-axis, is found in the truth table with the bottom line travel corresponding to a code reading of 1-0-0-0. The right vertical upward travel corresponds to a code reading of 0-1-0-0. The upper line travel corresponds to a code reading of 0-0-1-0, while the remaining left side or end travel corresponds to a code reading of 0-0-0-1. At each corner of the rectangle the resulting illumination of more than half of the photosensor will result in crossing over the threshold into $I_H$, whereupon an "up" count will cause a CCW change of direction.

BROKEN LINE OF FIG. 13

Figure 13:
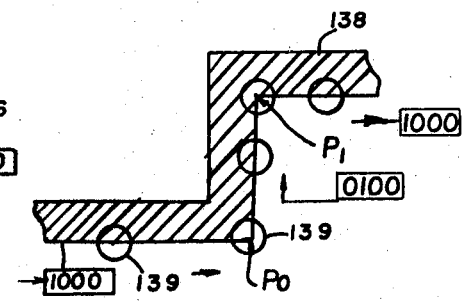
FIG. 13 represents a plan view of the "tracking" sequence of an edge of a broken line.

In FIG. 13 there is seen the "tracking" of a broken line 138, in which a photosensor 139 is disposed to follow the lower edge of this line. Assuming that the photocell is following a $+x$ path line of travel with a code reading of 1-0-0-0, the photosensor will proceed stepwise rightwardly until it reaches corner $P_o$, whereat the photosensor will become more than half illuminated and threshold $I_H$ will be crossed causing an "up" counting change of direction to occur. This results in a code "reading" of 0-1-0-0. As the photosensor is stepped upwardly the value of the $I_H$ decreases to $I_o$, and after moving into the "no count" zone of $I_o$, it will proceed upwardly in the $+y$ direction until the corner $P_1$ is reached. At $P_1$ the photosensor 139 becomes more than one-half dark and the threshold $I_L$ is crossed causing a clockwise turn to be made by a "down count" of the pulse. As the photosensor moves to $I_o$ the motion will remain in the $+y$ direction until a change is required.

Figure 14:
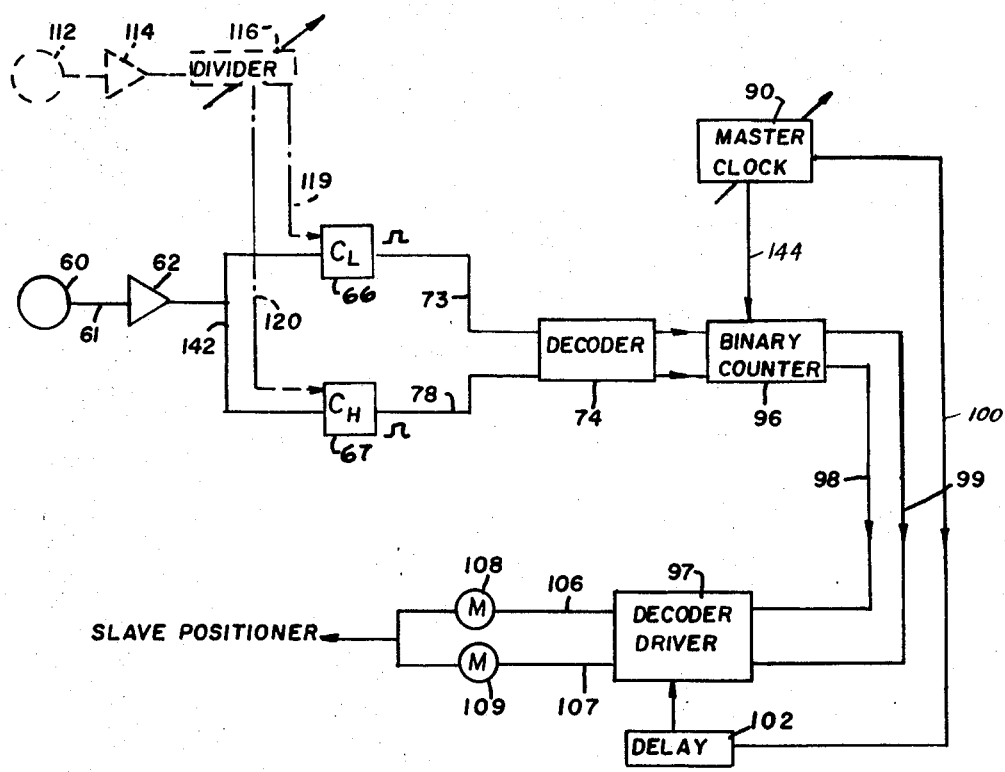
FIG. 14 represents a block circuit diagram of a simplified circuit similar to the circuit diagram of FIG. 9.

Referring next to FIG. 14, there is seen a block diagram of a simplified circuit of the optical curve tracer using only two comparators. In this circuit diagram the current output of the single photosensor 60 is fed through amplifier 62 to a distribution lead 142 feeding the current to comparator 66 ($C_L$) and to comparator 67 ($C_H$). The output of these comparators is fed through conductors 73 and 78 to decoder 74, thence through binary up-down counter 96, thence through conductors 98 and 99 to decoder driver 97, and thence through conductors 106 and 107 to actuators 108 and 109 to the slave positioner not shown. The master clock 90 feeds timed pulses through conductor 144 to the binary counter 96. Timed pulses are also fed through conductor 100 to delay 102, thence to decoder driver 97.

As in the circuit of FIG. 4, there may be provided a light level compensation means as provided by a photosensor 112, which receives the light and sends an output current through an amplifier 114 to a variable divider 116, thence through conductors 119 and 120 to comparators 66 and 67.

The output of the comparators $C_L$ and $C_H$ corresponds to logic signals "0" or "1" and in the casing given below:

|  |  | $C_L$ | $C_H$ |
|---|---|---|---|
| Case #1 | $I_\lambda < I_L$ | 0 | 0 |
| Case #2 | $I_L < I_\lambda < I_H$ | 1 | 0 |
| Case #3 | $I_\lambda > I_H$ | 1 | 1 |

The outputs of the comparators $C_L$ and $C_H$ are fed through a decoder to the binary up-down ring-counter. The decoder will make the binary counter count "up" when the photocurrent output corresponds to Case No. 1. There is no change in the ring-counter when the photocurrent output corresponds to Case No. 2. The decoder will make the binary counter count "down" when the photocurrent output corresponds to Case No. 3.

Although a simple system consisting of the two levels of thresholds $I_L$ and $I_H$ may be sufficient for some applications as shown in FIG. 14, practical considerations require some additional logic circuits in most instances. In the mechanical apparatus often used in this invention, the linear actuator is not free of backlash. When stepping motors are used as the actuating means, the rotors or the motors have positional hysteresis. In other words, the relative position of the field vectors of the rotor and the stator have a misalignment necessary to provide a holding torque. Both of these conditions cause error and if they exist, cause the logic to make an incorrect decision as described below. Therefore, it is an object of this invention to provide a compensation for such error or errors when they occur by means of the logic circuit $L_2$ shown in FIGS. 9 and 15. The problem caused by the above-mentioned backlash may result in a situation in which the photosensor is unbalanced by moving "out-of-line" such as is shown in FIG. 13 at position $P_o$.

The comparator $C_H$ and decoder will provide an "up" count for the next step when the photosensor moves into the condition of more than half illumination at position $P_o$. The "up" direction changes the direction of motion from $+x$ to $+y$. Although the $+y$ actuator will make one pulsed step in this direction, the backlash in the mechanism may result in no or little movement of the photosensor or "reading" head. If there is not sufficient movement of the "reading" head the photosensor will still "read" excess light and indicate a condition of $I_H$ to the circuit. This condition will then make another correcting "up" count change resulting in the next pulse step being not in the desired +y direction, but in the −x direction. This condition or result is, of course, not desirable and the result is an instability in the tracking of the line by the photosensor. This condition will result in the system oscillating around a corner such as the point $P_0$ of FIG. 13.

Logic $L_2$ is provided so as to eliminate this oscillating condition and situation. The logic statement implemented by the circuit $L_2$ is derived below.

As above-explained in conjunction with FIG. 9, the binary up-down counter, which is implemented with clocked J–K flip-flops and gates, will make changes in its state whenever the decoder output of "U" or "D" is low and the clock input of the binary counter is triggered. There will be no change in state "however" if "U" or "D" is high "1," or if the binary counter is not receiving a clock pulse. As shown in FIG. 9 the binary counter receives its clock pulses from the master clock by way of gate $G_1$, identified as 86. It is evident, therefore, that if inhibiting gate $G_1$ is blocking the pulses to the binary counter 96, there will be no change in state in spite of the fact that "U" or "D" may be low. The function of logic $L_2$ in conjunction with the inhibiting gate $G_1$ may be stated as follows:

Pulses from the master clock $C_1$ are allowed to be transferred to the binary counter if and only when:
1. $U = D = 1$, or
2. $Q = 1$
where $Q = 1$ if and only when
3. $U \neq D$ and in this case for one pulse only.

Designating the logic function described above by $f(1)$; $f(1) = C_1$ AND [$(D$ AND $U)$ OR $Q$]

Figure 15:
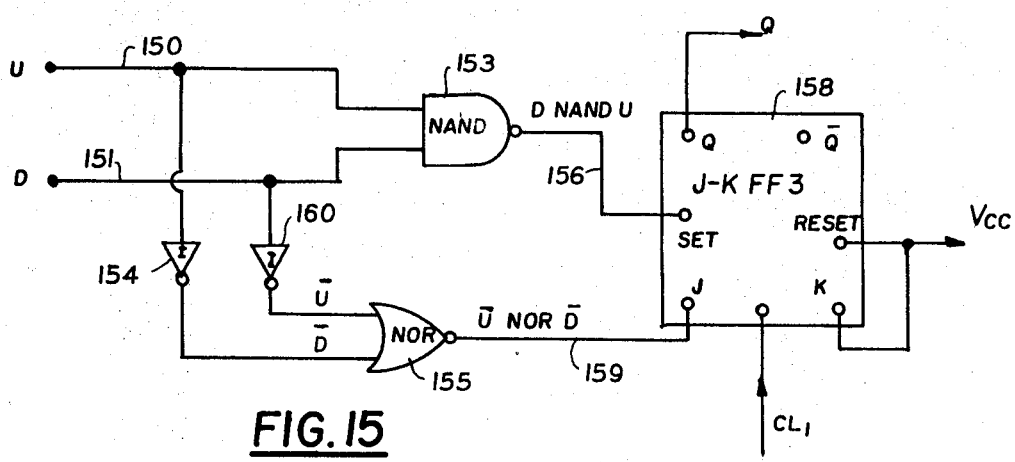
FIG. 15 represents a block circuit diagram of a logic and gate as used to provide a backlash compensation in the circuit diagram of FIG. 9.

The implementation of $Q$ is given in FIG. 15 and as it can be seen the flip-flop FF3 will be set back to its initial position only when again $U = D$, which is equivalent to a balance state of the photosensor.

IMPLEMENTATION OF Q FIG. 15

In FIG. 15 the logic circuit includes the input lines "$U$" and "$D$" identified as 150 and 151. Lead 150 carries current to a NAND-gate 153 and to an inverter amplified 154 thence to a NOR-gate 155. From input line 151 the current signal is fed to NAND-gate 153 to inverter amplifier 160 thence to NOR-gate 155. From NAND 153 the output current is fed through conductor 156 to FF3 or the flip-flop identified as 158. From NOR-gate 155, the output is fed through conductor 159 to the FF3 flip-flop 158.

Figure 16:
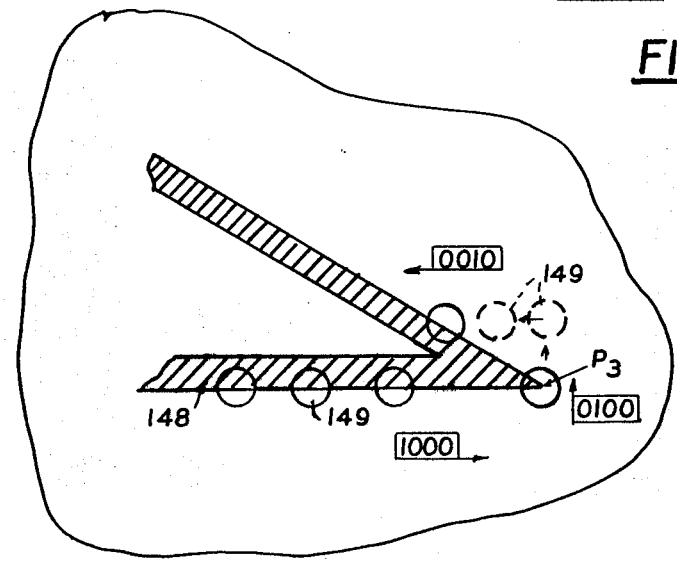
FIG. 16 represents a plan view of the "tracking" sequence of an edge of a broken line forming an acute included angle.

Thus far only the $C_L$ and $C_H$ comparator function has been considered. The illumination levels corresponding to the threshold level $I_{LL}$ and $I_{HH}$ are indicated in FIG. 5. There may be cases when the restriction of "one change in state only" as placed upon $L_2$ upon gate $G_1$ must be removed. FIG. 16 illustrates such a condition wherein an extremely sharp corner $P_3$ occurs in a line 148, as it is tracked by a photosensor 149. As the photosensor traveling in the +x direction approaches and reaches the corner $P_0$, the tracking will be changed from the original +x to +y when the illumination of the photocell changes from $I_0$ to $I_H$. The resulting "correcting" step pulse as it moves in the +y direction causes the photocell to provide an output of $I_{HH}$. The restriction of gate $G_1$, identified as 86, in FIG. 9, by Logic $L_2$ must be removed allowing the counter to make additional directional changes. The function of Logic $L_3$ is to allow "one" CCW change for every two (selectable to three or more as desired or required) pulses of the master clock 90.

In summary, when the $I_{HH}$ level is indicated the +y motion is changed into the −x direction. The x-stepping motor will make two (or more as selected) steps in the −x direction. If after two (or more as selected) steps the photocell 149 output is still $I_{HH}$, the Logic $L_3$ will allow "one" count in the CCW direction resulting in two (or more as selected) steps into the −y direction. It is therefore an intent of this invention to adapt the "reading" of $C_{LL} = C_{low\ low}$ and $C_{HH} = C_{high\ high}$ comparators identified as 65 and 68 respectively to the system with the accompanying logic circuits $L_1$ and $L_3$ as indicated in FIG. 9. As stated above, the threshold levels of $C_{LL}$ and $C_{HH}$ may be chosen freely and may be set by manual adjustment of the divider circuit in divider 116. Stabilization and compensation of the preset threshold levels are provided, as above stated, by the addition of the light level photosensor and its output identified as 112.

The description of the logic function of $L_1$ and $L_3$ follows. As above described the function of the binary up-down counter is to provide a directional change in the stepping of the positioner when required. This change is only possible if and when "U" or "D" is low and when the binary counter 96 receives a pulse at its clock input. The logic function for $L_1$ and $L_3$ in conjunction with the gate $G_1$ will affect the clock pulses going to the up-down binary counter as was the case with Logic $L_2$.

Designating the output of comparators $C_{LL}$ by $\lambda L$ and the output of $C_{HH}$ by $\lambda_H$ it is evident that when the photosensor is mostly in dark $I_{LL}$ both $\lambda_L$ and $\lambda_H$ will have an output "0." When the photosensor 60 is balanced $\lambda_L = 1$ and $\lambda_H = 0$ and when the photosensor is unbalanced far into the light region $\lambda_L = 1$ and $\lambda_H = 1$. With this in mind the logic function $f(2)$ as described above may be written as an equation as follows:

$f(2) = C_1$ AND [$(\bar{\lambda}_L + \lambda_H$ AND $f(3))$]

where
$C_1$ = the output pulse from the master clock
$\bar{\lambda}_L$ = the complement of $\lambda_L$
$f(3)$ = a gating function as described below.

Figure 17:
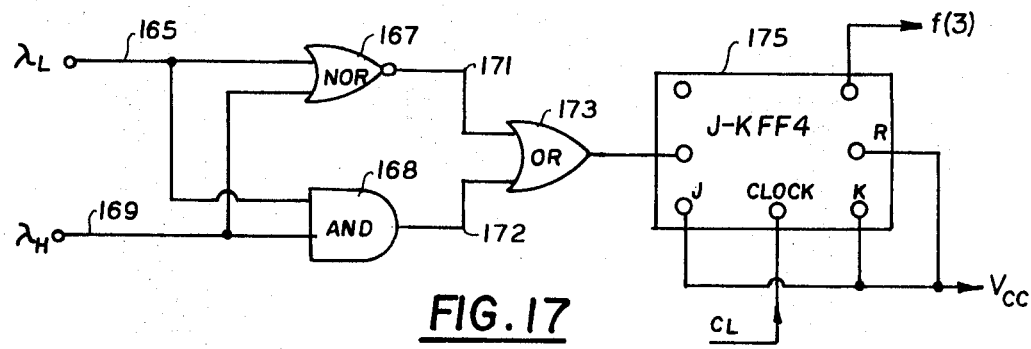
FIG. 17 represents a block diagram of the combined L1–L3 logic.

$f(3)$ permits one clock pulse to be sent to the binary up-down counter if and only when the flip-flop FF4 of the gating circuit FIG. 17 receives two (or three or more) pulses from the master clock 90. This pulse is received only when $\bar{\lambda}_L$ or $\lambda_H$ is equal to "1." FF4 is reset automatically when $\bar{\lambda}_L$ and $\lambda_H = 0$. The implementation of the $f(3)$ function is shown in FIG. 17.

CIRCUIT OF FIG. 17

Reference is next made to FIG. 17 and the circuit shown therein. Binary level from comparator $C_{LL}$ is transferred through conductor 165 which is identical to line 70 in FIG. 9, to NOR gate identified as 167 and to AND-gate 168. Binary level $\lambda_H$ from the comparator $C_{HH}$ is fed through conductor 169 identical to conductor 79 in FIG. 9 to AND-gate 168 and to NOR-gate 147. Through leads 171 and 172 signals are sent from NOR-gate 167 and AND-gate 168 to OR-gate 173. From this gate a signal is sent to J-K flip-flop 175 designated as FF4.

The circuit shown in FIG. 17 provides one directional change in the stepping actuation for every second pulse of the master clock 90. This change occurs only when $\bar{\lambda}_L$ or both $\bar{\lambda}_L$ and $\lambda_H$ is equal to "1. " One skilled in the art will recognize that by the addition of flip-flops the enabling of directional changes may be restricted to every three or more pulses of the master clock. In this manner is provided one of the important contributions of this invention to the state of the art. The above description enables both logic function $f(1)$ and $f(2)$ to be used simultaneously in the $F = f(1)$ OR $f(2)$ relationship

DESCRIPTION OF FIG. 18

Figure 18:
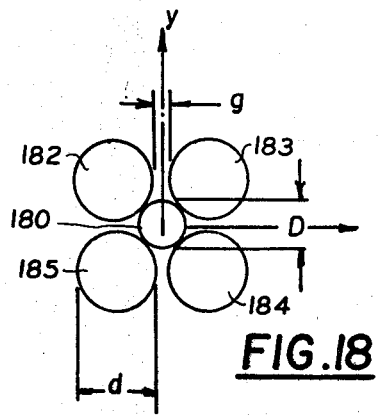
FIG. 18 represents a diagrammatic plan view of a grouping of five photosensors which includes a center photosensor surrounded by four peripheral photosensors arranged in a precise square.

Referring next to FIG. 18 there is shown an arrangement of five photosensors providing a means of incorporation of the single-photosensor scanning system above described with the four-photosensor scanning system shown in U.S. Pat. No. 3,502,882. There are conditions where the extreme accuracy of "stracking" provided by the single photocell system above-described may result in "two sensitive tracking." Note that the sensitive surface of the photocell may be adjusted by magnification or by using fiber optics in conjunction with photosensors as described in U.S. Pat. No. 3,502,882. The edge of line being followed may not be as smooth as is required to be made by the tracking of the photosensor. Scratches in the line may occur or the extreme accuracy of the above system may not be required. In these cases an "averaging" of the tracing path may be desirable rather than follow each "fuzz" of the line.

FIG. 18 depicts an arrangement for this condition wherein a central photosensor 180 is surrounded by four larger photosensors 182, 183, 184 and 185 arranged in a precise square and in a contiguous relationship with the photosensor 180. Depending upon the selection of the diameters of the fibers optics a certain gap or space $g$ may occur between the peripheral photosensitive surface. The relationship between gap $g$ and the photosensors may be expressed in the following equation:

$$g = \frac{(D+d)}{\sqrt{2}} - d$$

where gap $g$ does not exist or it is zero, the relationship between the center sensor diameter D and the peripheral photosensor $d$ is expressed as $$d = \frac{D}{\sqrt{2}-1} \approx 0.241D$$

In practice it is an object of this invention to use diameter ratios as close as possible to providing a zero gap $g$ as above expressed.

Figure 19:
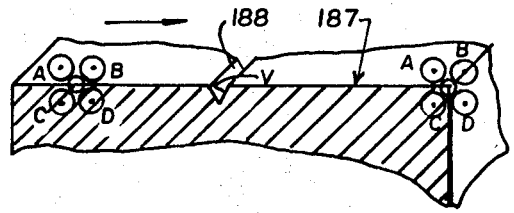
FIG. 19 represents an isometric view which is a somewhat diagrammatic means of showing the operation of the "reading" head of FIG. 18.

The operation of such a "tracking" or "reading" head with such a matrix provides that the prime scanners are the peripheral photosensors 182, 183, 184 and 185. The "tracking" of the edge of the curve occurs in accordance with the information above and my U.S. Pat. No. 3,502,882. The functional relation between the peripheral and center photocells may be more easily understood by a related example as shown in FIG. 19. In this figure assume that four balls or rollers A, B, C, D are arranged in a square pattern and that the peripheries of all these rollers will touch the edge 187 of a plate or platform. These rollers are interconnected at their axes so as to be retained in a determined spaced relationship. As they are moved upon the plate in the direction of the arrow they roll in a straight line. When the interconnected system reaches the void 188 also indicated by the small letter $y$, the center smaller roller unless supported by the interconnecting framework would fall into the notch or 188.

Substituting the rollers of this FIG. 19 for the photosensors of FIG. 18 and their circular sensitive surfaces, the action of the matrix of FIG. 18 will operate in the same manner. Either fiber optics or circular photosensitive chips arranged as in FIG. 18 provide a system in which their behavior is like the mechanical equivalent shown in FIG. 19.

In the function of the four photosensors as shown and described in my U.S. Pat. No. 3,502,882, there is shown in FIG. 9 of that patent a "blind" indicator identified by the number 111. The function of the center photocell of FIG. 18 is to be directly coupled to this "blind" indicator. If, and only if, the blind indicator is actuated in a manner corresponding to an illumination configuration of 0-0-0-0 or 1-1-1-1-as described in conjunction with the truth table of U.S. Pat. No. 3,502,882 a clockwise or counterclockwise turn will be made depending upon the "tracking" sense selected by the operator and the illumination level of the center photosensor. Referring to FIG. 5 in the reference U.S. Pat. No. 3,502,882, there is shown a CCW sense of "tracking" so that whenever a "blind" indication takes place and the center photocell is illuminated, the direction of stepping will be changed counterclockwise and one (or two or more as set) steps will be made in that direction.

If after one (or two or more as set) step the "blind" state still exists and the center photosensor is still illuminated, another directional change is made in the CCW direction and one (or two or more as set) step is made in that direction. This process will continue until the "blind" state changes. In like manner, if a "blind" indication occurs and the center photosensor is in the dark, the direction of stepping will be changed clockwise and one (or two or more as set) step will be made in the new direction. The circuit for the operation of the center photosensor 180 is identical to the circuit of FIG. 14 in which the two comparators $C_L$ and $C_H$ feed the information to the decoder and binary up-down counter and to the decoder driver. The complete five photosensor circuit with the additional photocell providing for threshold comparison is shown in FIG. 20.

DESCRIPTION OF CIRCUIT OF FIG. 20

Figure 20:
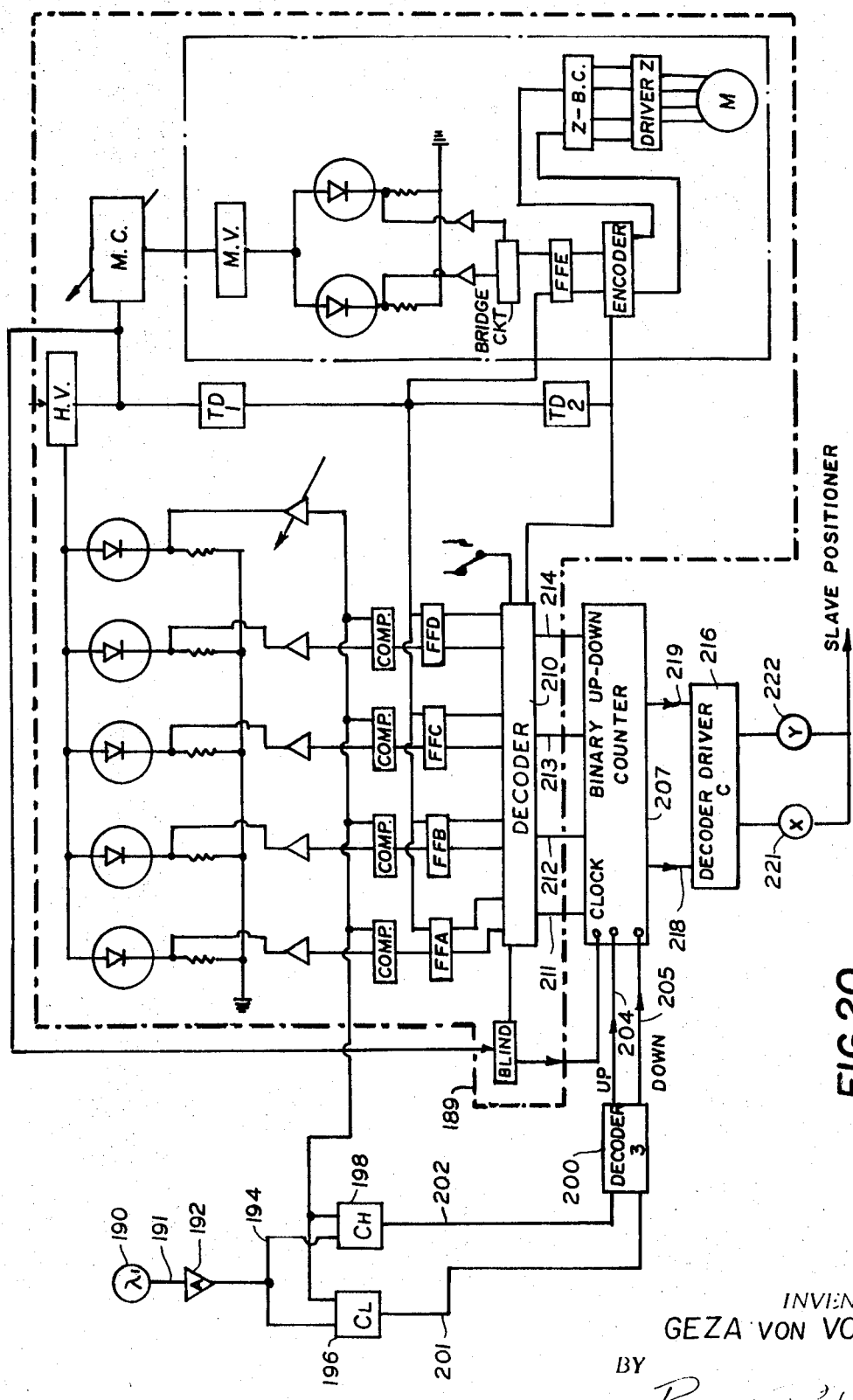
FIG. 20 represents a block diagram of the circuit for the operation of the "reading" head of FIG. 18.

Referring next to the circuit diagram of FIG. 20 it is to be noted that the circuit portion within the heavy dashed outline identified as 189 is identical with the same portion of the circuit of FIG. 9 of my referenced patent. The function of this circuit without the addition of the center photosensor is fully described in the referenced and incorporated U.S. Pat. No. 3,502,882. The function of the center photosensor in conjunction with the four peripheral photosensors is shown in FIG. 20 wherein the center photosensor $\lambda_1$ is identified as 190 and its output is fed through lead 191 to amplifier 192 and to a common lead 194. One of the lead is fed to comparator 196 which provides the threshold for $C_L$. The other of the leads is fed to the comparator 198 which provides the threshold of $C_H$. The output from comparator 196 is fed to a decoder 200 through a conductor 201. The output from comparator 198 is fed through a like conductor 202 to the same decoder 200. The output of this decoder is fed through conductors 204 and 205 to a binary up-down counter 207. This counter also receives commands from the decoder 210 through four output leads 211, 212, 213 and 214. From this counter commands are fed to decoder driver 216 through leads 218 and 219. The output from this driver is fed to the $x$ and $y$ actuators 221 and 222 and to the slave positioner not shown.

The four output leads 211, 212, 213 and 214 from the decoder 210 correspond to the commands for stepping in the $+x; -x, +y$, and $-y$ direction and are coupled to the proper "set" and "reset" terminals of the gated binary up-down counter 207. This counter consists of two J-K flip-flops which command the decoder driver 216 of the stepping motor command system as fully described above. The clock pulses to the binary counter are inhibited by the "blind" circuit which in the present invention is a simple AND gate. Therefore the function of this circuit for all combinations of illumination of the four peripheral photosensors, with the exception of the "blind" combination 0-0-0-0 or 1-1-1-1, will be the same as described in the U.S. Pat. No. 3,502,882. The "blind" indication with the exception of the binary numbers 0-0-0-0 or 1-1-a'-1 has no effect on the up-down binary counter 207. Such a combination however will actuate the AND gate represented by the "blind" block. Depending upon the illumination of the center photosensor 190, the decoder 200 will define "up" or "down" counting for the present number of pulses. This number will be one or two or more as set by the operator. It is to be further noted that if these steps result in a change in the preceding illumination combinations of 0-0-0-0 or 1-1-1-1 the "blind" gate will inhibit further pulses to the binary up-down counter 207 and the "tracking" operation will continue in the prescribed manner governed by the peripheral photosensors 182, 183, 184 and 185.

This circuit will also prevent the "walkway" situation which may occur on a line lying in close relation to either the $x$ or $y$ coordinate as more fully explained next.

DESCRIPTION OF THE TRACKING OF FIG. 21

Figure 21:
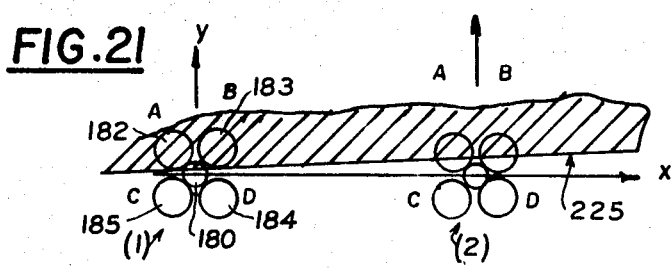
FIG. 21 represents the "reading" head of FIG. 18 following a line as it deviates from the x-axis coordinate.

In FIG. 21 is depicted a line or edge 225 disposed at a slight angle to the $x$-axis. At its leftward position (1) the "reading" head will have the grouping of the photosensors of FIG. 18 disposed so that the small central photosensor 180 is exactly on the $x$-axis. The commands being fed to the actuators are clearly in the $+x$ direction and the actuation is in accordance with CCW outside "edge tracking" according to the truth table of U.S. Pat. No. 3,502,882. It may happen that when the "tracking" reaches the position (2) all four peripheral photosensors will suddenly indicate a "1" signal which corresponds to the "blind" state 1-1-1-1. The center photocell 180 will then initiate a CCW turn in the stepping sequence. This movement in the +y direction for one (or two or more as set) step will bring the reading head again to the edge of the line being tracked thereby eliminating the tracking error. After the step is accomplished in the +y direction the "blind" state is removed and stepping will commence in the +y direction.

In both the present invention and in my U.S. Pat. No. 3,502,822 it is contemplated that "electronic magnification" may be employed in connection with the reading of a line. For example, if a workpiece is to be made to a tolerance of one-thousandth of an inch it is quite practical to make a precise drawing or curve of one-tenth that size. A single logic circuit consisting of binaries and known as binary pulse rate scaler or multiplier may be inserted between the reading and the actuating system. For example, by setting the binary rate scaler to 1:10 each step of the reading head, say in the +x direction, will result in 10 steps in the +x direction by the slave positioner. Conversely, if super precision is desired a reverse arrangement can be made whereat a drawing is made at a scale which is two, four, five, 10 or some other selected number of times larger than the workpiece. The "reading" of the drawing will cause the slave positioner to be moved at the proportionally fewer stepwise pulses.

Although the photosensor arrangement of FIG. 18 shows the peripheral sensors in a spaced arrangement it is to be noted that as it is necessary in the like arrangement of my U.S. Pat. No. 3,502,882 the gap $g$ between photosensors must be less than the effective diameter of the photosensor and to increase the accuracy of performance the "reading" ends of the peripheral photosensors are desirably contiguous or nearly so.

As to whether the fiber optics are formed as a tapered or a cylindrical member is merely a matter of selection. The effective end of the fiber optic is usually a matter of a few thousandths of an inch in diameter and the relationship of size of the inside or central fiber optic to the outside peripheral optics is also a matter of selection although it is desirable that the gap $g$ as seen in FIG. 18 is made as small as possible.

The above disclosure does not include a display or showing of a three-dimensional reading apparatus; however, reference is made to the suggested arrangement shown in the reference U.S. Pat. No. 3,502,882. It is only necessary to provide "reading" means which is in addition to the x-y "reading" head shown. This additional means consists of a reading head arranged to read the rise and fall of a line representing the third z dimension. It is also to be noted that the clock rate provided by the master clock is adjustable so that the pulse rate may be made to provide the desired stepping rate or tool speed of the actuators when the slave positioner is adapted to move a machine tool.

Although in the above description of FIGS. 1, 2, 3, 4, 6, 8, 11, 12, 13 and 16 the circles representing the "tracking" sequence of the edge refers to the projected sensitive surface of a photosensor as such, it is contemplated that a concentrated light source may be directed at the edge of the data or line and the resulting light pattern be received by a photocell whose axis is in coincidence with the axis of the concentrated light beam. In such an arrangement either the light beam and photocell may be stepwise moved, the workpiece or print be stepwise moved or a combination of such movements may be made. It is contemplated that the above description, drawings and claims will cover such an alternate arrangement.

Terms such as "left," "right," "up," "down," "in," "out," "clockwise," "counterclockwise" and the like are applicable to the embodiments shown and described in conjunction with the drawings. These terms are merely for the purposes of description and do not necessarily apply to the position in which the incremental optical curve tracer with sequential logic may be constructed or used.

The conception of the fiber optical reading head and its many application is not limited to the specific embodiments shown but departures therefrom may be made within the scope of the accompanying claims and without sacrificing its chief advantages and protection is sought to the broadest extent the prior art allows.

What is claimed is:

1. An incremental optical curve tracer utilizing a sequential logic system and adapted to provide means for precision machining, processing, drawing and the like through the stepwise movement of a reading head as it "reads" the illuminated edge of a line, workpiece, visual data and the like and converts the "tracking" of the edge of this line into linear and rectilinear equivalents, said curve tracer including: (a) a source of data to be "read"; (b) a light source providing illumination for the data to be "read"; (c) an optical reading means carried in the reading head, said means including at least one circular photosensor adapted to receive an image of the illuminated data "read," said photosensor responsive to the reading of the edge of the data so as to send an output signal to at least two comparators; (d) a logic circuit adapted to receive the signals from said comparators and to transcribe these signals into commands for the stepwise movement of a positioning means adapted to transport the optical reading means along the edge of the data being "read"; (e) means for limiting the length of the stepwise movement of the positioner in relation to the effective radius of the circular photosensor wherein each stepwise movement is not more than two-fifths of $R/M$ where $R$ is equal to the radius of said effective circular reading are and $M$ is equal to the magnification of the "read" portion of the data to the area of the photosensor, and (f) means for displacing in a stepwise manner a slave-positioning means movable in a precise relationship to the displacement of the optical reading means as it is moved along the edge of the data being "read."

2. An incremental optical curve tracer system as in claim 1 in which the width of the line providing the data to be "read" is at least twice as great as the radius of the effective reading spot.

3. An incremental optical curve tracer system as in claim 1 in which there is also provided an additional photosensor carried by the optical head, said additional photosensor adapted to "read" the general light level of the source of data and provide a control means for maintaining the present threshold levels of the comparators against variations in light level.

4. An incremental optical curve tracer system as in claim 3 in which the photosensor reading means is a single optical fiber having a tapered end portion extending from a main body to an image-receiving end of greatly reduced diameter and with the body end being optically connected to the photosensor.

5. An incremental optical curve tracer system as in claim 1 in which the two comparators are arranged to analyze the signal levels of the photosensor output, each comparator having a settable threshold level with one comparator ($C_H$) adapted to evaluate and be actuated by a current flow from the photosensor when it is more than one-half illuminated and with the other comparator ($C_L$) adapted to evaluate and be actuated by a current flow from the photosensor when it is less than one-half illuminated.

6. An incremental optical curve tracer system as in claim 1 in which the two comparators are arranged to analyze the output current of the photosensor with each photosensor having its threshold level set by an adjustable divider so that at one condition the exact center of the photosensor may be made to "track" the edge of the data and at another setting condition the thresholds cause the center of the photosensor to be offset a predetermined distance from the edge being "read."

7. An incremental optical curve tracer system as in claim 1 in which the digital logic includes two additional comparators and with all four comparators having their threshold levels set by an adjustable divider so the comparators at one set condition will have the exact center of the photosensor adapted to "track" the edge of the data and at another set condition the thresholds of the comparators cause the center of the photosensor to be offset a predetermined distance from the edge of the data being "read."

8. An incremental optical curve tracer system as in claim 1 in which the logic control is provided with two additional comparators whose adjustable thresholds may be set by an adjustable divider, of the four comparators a first is disposed to analyze the output signal from the photosensor and to be actuated by the highest current threshold level to actuate the logic system; a second comparator is disposed to be actuated by a high current level when the photosensor is more than half illuminated; an third comparator is disposed to be actuated by a low current level when the photosensor is less than half illuminated, and the fourth comparator is disposed to be actuated by the lowest current level when the photosensor is less illuminated.

9. An incremental optical curve tracer system as in claim 1 in which there is provided means for electronically magnifying and scaling the movement of the slave-positioning means in relation to the movement of the reading head.

10. An incremental optical curve tracer system as in claim 1 in which the logic system includes additional logic means by which backlash, motor positional hysteresis and other like error, causing conditions in the operation of the rectilinear mechanism is compensated for by the addition of electronic means allowing one directional change of 90° from the state of the stepping direction for the duration of at least one additional clock pulse.

11. An incremental optical curve tracer system as in claim 10 in which the additional electronic means providing the compensation for the operation of the mechanism has a duration of more than one pulse.

12. An incremental optical curve tracer system as in claim 10 in which the logic system includes additional logic means by which a logic gate means providing restrictions for one change only in directional state is removed by this additional logic for the duration of at least one additional clock pulse.

13. An incremental optical curve tracer system as in claim 12 in which the logic means removing the restrictions from the gate has a duration of more than one pulse.

14. An incremental optical curve tracer system as in claim 11 in which the logic system includes additional logic means by which a logic gate means providing restrictions for one change only in directional state is removed by this additional logic for the duration of at least one additional clock pulse.

15. An incremental optical curve tracer system as in claim 14 in which the logic means removing the restrictions from the gate has a duration of more than one pulse.

16. An incremental optical tracer system as in claim 1 in which the optical "reading" means has no internal motion of components in relation to the frame of the "reading" head.

17. An incremental optical tracer system as in claim 1 in which the optical "reading" means has a central photosensor surrounded with four additional peripheral photosensors arranged in a precise square and with the four of alike-sized photosensors disposed in a contiguous relationship with the central photosensor, and if a gap exists between adjacent peripheral photosensors, the gap between the outer peripheral photosensors is less than the effective diameter of a peripheral photosensor and of the central photosensor.

18. An incremental optical tracer utilizing a sequential logic system and adapted to provide for precision machining, processing, drawing and the like through the relative stepwise movement of an optical "reading" means to an illuminated edge of data such as a line, workpiece and the like so as to analyze the "tracking" of the edge of such data and convert such analyzed "reading" into linear and rectilinear signal equivalents, said curve tracer including: (a) a source of data to be "read"; (b) a concentrated light source adapted to illuminate the edge of the data to be "read"; (c) a photosensor adapted to receive the concentrated light source, said light source and photosensor being axially in coincidence; (d) means for providing a precise circular "reading" effect in the combination of concentrated light source and photosensor to provide an optical "reading" means, said reading means sending an output signal to at least two comparators; (e) a logic circuit adapted to receive the signals from said comparators and to transcribe these signals into commands for the stepwise movement of a positioning means adapted to provide relative stepwise movement of the optical reading means and the source of data, and (f) means for displacing in a stepwise manner a slave-positioning means in a precise relationship to the optical "reading" means as it is moved along the edge of the data being "read."

19. An incremental optical tracer system as in claim 18 in which the concentrated light source is circular in configuration.

20. An incremental optical tracer system as in claim 18 in which the effective surface of the photosensor is precisely circular.

PO-1050
(5/69)

UNITED STATES PATENT OFFICE
CERTIFICATE OF CORRECTION

Patent No. 3,610,935                     Dated October 5th, 1971

Inventor(s) Geza von Voros

It is certified that error appears in the above-identified patent and that said Letters Patent are hereby corrected as shown below:

Page 1, Abstract, Col. 2, line 20, "Two should read -- two --.

Col. 2, line 3, "stystem" should read -- systems --;
           line 72, "ad" should read -- and --;
           line 74, after "is" insert -- a --;

Col. 5, line 59, "pring" should read -- print --;
           line 75, "to read" should have quotes only around -- read --.

Col. 6, line 6, "fibers" should read -- fiber --;
           line 34, the equasion should read --
           $A/Ao = 1/\pi \left\{ \cos^{-1}\lambda - [\lambda(1-\lambda^2)^{\frac{1}{2}}] \right\}$ --;
           line 43, delete "in" second occurrence.

Col. 7, line 9, "lie" should read -- line --.

Col. 8, line 9, "Signal" should read Signals --;
           line 53, the equasion
           $d = D/\sqrt{2} - 1 \approx 0.241D$ should be deleted;
           line 65, after "which" should be inserted table --

| $C_H$ | $C_L$ | U | D |
   |---|---|---|---|
   | 0 | 0 | 0 | 1 |
   | 0 | 1 | 1 | 1 |
   | 1 | 0 | 1 | 1 |
   | 1 | 1 | 1 | 0 |

UNITED STATES PATENT OFFICE
CERTIFICATE OF CORRECTION

Patent No. 3,610,935      Dated October 5th, 1971

Inventor(s) Geza von Voros

It is certified that error appears in the above-identified patent and that said Letters Patent are hereby corrected as shown below:

Col. 9, line 24, after "follows" should be inserted table --

| | |
|---|---|
| FF1 | 0101 |
| FF2 | 0011 |
| +x | 1000 |
| +y | 0100 |
| -x | 0010 |
| -y | 0001 |

Col. 9, line 50, delete "counterclockwise";
    line 51, before "direction" insert -- counterclockwise --.

Col. 10, line 8, "+y" should read -- +x --;
    line 29, "casing" should read -- cases --.

Col. 11, line 16, remove quotes from "however" and insert a comma after "however";
    line 42, "amplified" should read -- amplifier --.

Col. 12, line 10, add hyphen after "above";
    line 26, the equasion should read --
$$f(2) = C_1 \text{ AND } [(\bar{\lambda}_L + \lambda_H) \text{ AND } f(3)]$$ --;
    line 46, "147" should read -- 167 --;
    line 68, "stracking" should read -- tracking --;
    line 74, "tracking" should be in quotes.

Col. 13, line 8, "fibers" should read -- fiber --;
    line 8, 10, 16 and 24, "g" should be in quotes;

PO-1050
(5/69)

UNITED STATES PATENT OFFICE
CERTIFICATE OF CORRECTION

Patent No. 3,610,935  Dated  October 5th, 1971

Inventor(s) Geza von Voros

It is certified that error appears in the above-identified patent and that said Letters Patent are hereby corrected as shown below:

line 24, after "above" add a hyphen;
        line 40, "y" should read -- v --.

Col. 14, line 20, "lead" should read -- leads --;
        line 48, "1-1-a'-1" should read -- 1-1-1-1 --;
        line 52, "present" should read -- preset --.

Col. 15, line 7, "+y" should read -- +x --;
        line 30 and 40, "g" should be in quotes;
        line 74, "application" should read -- applications --.

Col. 16, line 27, "are" should read -- area --;
        line 41, "present" should read -- preset --.

Col. 17, line 9, "an" should read -- a --.

Col. 18, line 28, "reading" should be in quotes.

Signed and sealed this 26th day of September 1972.

(SEAL)
Attest:

EDWARD M. FLETCHER, JR.
Attesting Officer

ROBERT GOTTSCHALK
Commissioner of Patents